United States Patent [19]

Stiles, Jr. et al.

[11] Patent Number: 5,339,244
[45] Date of Patent: Aug. 16, 1994

[54] INTEGRATED TIME/LIMIT EXCEEDANCE CUE SYSTEM

[75] Inventors: Lorren Stiles, Jr., Roxbury; Nicholas D. Lappos, Milford; Gregory P. Wright, Ansonia, all of Conn.

[73] Assignee: United Technologies Corporation, Hartford, Conn.

[21] Appl. No.: 929,323

[22] Filed: Aug. 13, 1992

[51] Int. Cl.⁵ .............................................. G06F 15/50
[52] U.S. Cl. ............................... 364/424.06; 340/945; 340/113
[58] Field of Search .................. 364/426.04; 340/945, 340/963, 969, 978, 980, 722, 753; 395/141, 159

[56] References Cited

U.S. PATENT DOCUMENTS

| | | | |
|---|---|---|---|
| 4,763,285 | 8/1988 | Moore et al. | 364/551 |
| 4,847,785 | 7/1989 | Stephens | 364/518 |
| 4,954,974 | 9/1990 | Howell, IV et al. | 364/551.01 |
| 5,050,081 | 9/1991 | Abbott et al. | 364/424.06 |
| 5,119,305 | 6/1992 | Ferro | 364/460 |
| 5,136,516 | 8/1992 | Twombly | 364/426.05 |

*Primary Examiner*—Thomas G. Black
*Assistant Examiner*—Susan Wieland
*Attorney, Agent, or Firm*—Terrance J. Radke

[57] ABSTRACT

An integrated time/limit exceedance cue system including a plurality of dedicated subsystem sensors, a processing unit, and a graphics generating/processing unit that is operative to generate an event dependent, time varying visual cue indicative of the exceedance of an established normal operating limit of a specific aircraft subsystem and operation thereof in a time critical exceedance condition. The time varying visual cue provides a relative indication of the elapsed time of operation of the specific subsystem in the time critical exceedance condition. The time varying visual cue is a symbolic image in the form of an outline, having a predetermined length, that defines a void region. The void region is proportionately opaqued or "filled in" in correspondence with the elapsed time of operation of the specific subsystem in the time critical exceedance condition. The outline of the visual cue may be shaped and/or have a spatial orientation that is cognitively connected to the particular subsystem and/or to a symbolic image or display representing the specific generated status data provided by the dedicated subsystem sensors for monitoring the operation of the particular subsystem. The cue system may provide a corrective action cue in conjunction with the time varying visual cue that provides information as to the appropriate recovery procedure to restore the particular subsystem to operation within its established normal operating range.

15 Claims, 6 Drawing Sheets

TURBINE GAS TEMPERATURE

| | | |
|---|---|---|
| 10-SECOND TRANSIENT | | 850–886°C |
| MAXIMUM AND START ABORT LIMITS | ▓▓▓ | 850°C |
| 30 MINUTE LIMIT | ▓▓▓ | 775–850°C |
| NORMAL | ▓▓▓ | 0–775°C |
| DIGITAL READOUT IN AMBER | ▓▓▓ | TGT READOUT |

LEGEND
- RED
- YELLOW
- GREEN

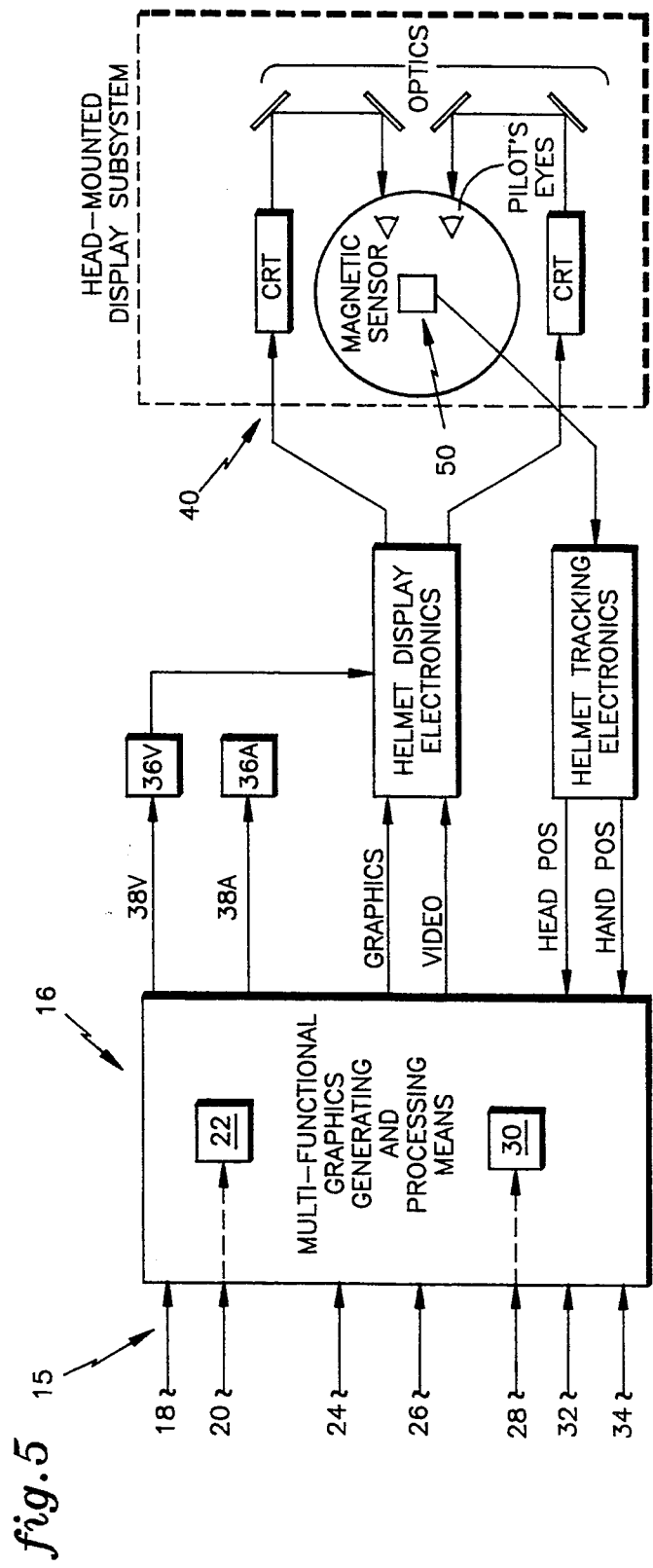
fig. 5
fig. 6A
fig. 6B

INTEGRATED TIME/LIMIT EXCEEDANCE CUE SYSTEM

FIELD OF THE INVENTION

The present invention relates to aircraft status display systems, and more particularly, to an integrated time/limit exceedance cue system that provides the pilot with event dependent time varying visual cues indicative of exceedance of established operating limits of specific aircraft subsystems and the operating time of such subsystems in such an exceedance condition.

BACKGROUND OF THE INVENTION

Future generation aircraft (including helicopters) now in planning and/or development phases (as well as many present generation aircraft) are complex systems comprised of a large number of interrelated, complex subsystems such as the airframe, powerplant, main and tail rotor assemblies, flight controls, avionics, navigation equipment, armament, etc. Such subsystems generate significant amounts of status data, much of which must be frequently monitored by the pilot and/or co-pilot for the safe and/or efficient operation and/or pilotage of the aircraft. A considerable portion of the pilot workload in these future generation aircraft will be devoted to monitoring the status of the aircraft subsystems during flight operations via reference to generated status data.

Of particular concern to pilots is the operation of an aircraft within the defined flight envelope thereof such that aircraft subsystems are operated within the normal operating ranges established for such subsystems. Such normal operating ranges are based upon engineering criteria that ensure that such subsystems are not subjected to inadvertent dynamic stresses that may degrade the capability of the subsystem and preclude such subsystem from operating for specified life intervals (established time periods between inspections, maintenance, and/or replacement). Operation of such subsystems in exceedance of the established normal operating ranges may adversely impact the structural and/or functional integrity of such subsystems and may degrade the specified life intervals thereof. This can result in unnecessary aircraft downtime and cost for unscheduled subsystem post-flight inspections, maintenance, and/or replacements.

Conversely, however, flight conditions arise wherein the pilot must be able to utilize the maximum performance capability of the aircraft as provided through its various subsystems. Typically, aircraft subsystems are overdesigned (built-in safety margins) so that such subsystems may be operated at the upper limit of established normal operating ranges indefinitely without adversely affecting the specified life intervals of such subsystems. In addition, most subsystems have been overdesigned to such a degree that such subsystems may be operated in exceedance of the upper limit of the established normal operating ranges for a limited period of time, i.e., a time critical exceedance condition, without adversely impacting the specified life intervals thereof.

The established normal operating ranges, the upper limits of such operating ranges, and acceptable exceedance conditions beyond the established normal operating ranges (permissible exceedance ranges, predetermined exceedance time limits), are generally defined in the operator's manuals of complex aircraft. In addition, such subsystem information may be incorporated in the pilot's status displays for such subsystems (see, e.g., FIGS. 3 and 4 of the drawings and the accompanying description thereof hereinbelow). However, while such information regarding the exceedance of an established normal operating range for any specific subsystem is generally available to the pilot (either as personal knowledge or as incorporated in a status display), the burden is upon the pilot to continually monitor the status of numerous subsystems so as to be promptly aware of the exceedance of an established operating range. Moreover, a pilot must generally mentally track predetermined exceedance time limits for subsystems operating in time critical exceedance conditions. The pilot workload imposed by these conditions may be exacerbated if a subsystem has more than one defined time critical exceedance condition or if priorities must be established when more than one subsystem exceeds its established normal operating range.

Mission requirements for future generation aircraft may involve a greater percentage of high pilot workload operations such as nap-of-the-earth (NOE), adverse weather, and/or night flying. Such high pilot workload flight operations require the pilot to maintain a continual spatial awareness of aircraft orientation and/or location with respect to the external world and a situational awareness of objects of interest in the external world vis-a-vis the aircraft in addition to continual monitoring of the status of aircraft subsystems. Such high pilot workload operations may reduce the probability that a pilot will be promptly aware that operation of a specific subsystem has exceeded an established normal operating range. In addition, such high pilot workload operations adversely affect the pilot's ability to mentally track predetermined exceedance time limits for subsystems operating in time critical exceedance conditions. As a corollary of Murphy's Law, there is a high probability that flight conditions where the pilot must be able to utilize the maximum performance capability of the aircraft with respect to specific subsystems will occur during high pilot workload operations such that the pilot's ability to monitor and/or respond to time critical exceedance events is impaired.

A need exists for a cuing system that provides the pilot with a visual cue when a particular subsystem is operated so as to exceed its established normal operating range and operate in a time critical exceedance condition. A need exists to provide a visual cue that provides a time varying indication of the relative length of time wherein the particular subsystem has operated within the time critical exceedance condition. To effectuate prudent and efficient operation of such particular subsystem, the cuing system should also provide an indication of the appropriate recovery procedure to return the particular subsystem to operation within its established normal operating range. Furthermore, the visual cue generated by such cuing system should be cognitively connected to the particular subsystem and/or to the symbolic image or display representing the specific generated status data provided for monitoring the operation of the particular subsystem to facilitate pilot recognition of a particular time critical exceedance event.

SUMMARY OF THE INVENTION

One object of the present invention is to provide an integrated time/limit exceedance cue system that generates a visual cue whenever a particular subsystem exceeds an established normal operating limit and operates in a time critical exceedance condition.

Another object of the present invention is to provide an integrated time/limit exceedance cue system that generates a time varying visual cue that indicates the relative time of operation of the particular subsystem in the time critical exceedance condition.

Yet a further object of the present invention is to provide an integrated time/limit exceedance cue system that generates a visual cue having a shape and/or spatial orientation that is cognitively connected to the particular subsystem and/or to the symbolic image or display representing the specific generated status data provided for monitoring the operation of the particular subsystem.

Still a further object of the present invention is to provide an integrated time/limit exceedance cue system that provides a corrective action cue that alerts the pilot as to the appropriate recovery procedure to restore the particular subsystem to operation within its established normal operating range.

These and other objects are provided by an integrated time/limit exceedance cue system according to the present invention that is operative to provide a pilot with an event dependent visual cue indicative of the exceedance of established normal operating limits of specific aircraft subsystems and operation thereof in a time critical exceedance condition. The cue system permits the pilot to utilize the maximum performance capability of such aircraft subsystems without degrading the defined life intervals thereof. The cue system is further operative to prevent inadvertent exceedance of the time critical operating intervals of such specific subsystems by providing real time feedback during operation of the aircraft subsystem in a time critical exceedance condition.

The integrated time/limit exceedance cue system is operative to generate a visual cue when a specific aircraft subsystem exceeds an established normal operating limit, i.e., generation of the visual cue is event dependent. The exceedance events that trigger operation of the cue system are the operation of specific subsystems beyond defined "maximum continuous" operating limits, i.e., operation in a "time interval" condition. The system is further operative to provide a time varying visual cue that is continuously updated to visually indicate the relative time period during which the specific aircraft subsystem has operated in the "time interval" condition. Conversely, the time varying visual cue provides an indication of the time remaining until the specific aircraft subsystem exceeds the predetermined time limit established for operation in the "time interval" condition. Preferably the time varying visual cue is juxtaposed in combination with the symbology depicting the baseline operating parameter of the specific aircraft subsystem to provide cognitive connectivity between the exceedance event and the specific aircraft subsystem. The cue system may be further operative to provide a corrective action cue in conjunction with the time varying visual cue that alerts the pilot as to the appropriate recovery procedure to restore the specific aircraft subsystem to operation within established normal operating limits, i.e., out of the "time interval" condition.

The integrated time/limit exceedance cue system of the present invention includes one or more dedicated sensor subsystems, a processing means, and a multi-functional graphics generating/processing means. The integrated time/limit exceedance cue system of the present invention is preferably configured for utilization in a helmet-mounted display (HMD) system or a head-up display (HUD) system. The cue system of the present invention may also be utilized in conjunction with dedicated head-down or multi-function graphic display systems.

Specific helicopter subsystems are typically instrumented by one or more dedicated sensor subsystems which are operative to monitor the operation of such specific helicopter subsystems and are operative to provide parameter signals representative of the operating conditions of such specific helicopter subsystems. The processing means is a computer system such as a microprocessor that is operative to monitor the parameter signals of the dedicated sensor subsystems and to provide control signals to regulate the operation of the multi-functional graphics generating/processing means. The Core Automatic Flight Control System (AFCS) processor of an aircraft such as a helicopter may be configured to effectuate the functions of the processing means of the cue system. Alternatively, the graphics display processor of the multi-functional graphics generating/processing means may be configured to effectuate the functions of the processing means, or a dedicated stand alone microprocessor may be utilized.

Algorithms that effectuate the functions of the processing means include: (1) an algorithm to monitor the sensed parameter signals generated by the dedicated sensor subsystems; (2) algorithms to compute any required derived parameter signals; (3) an algorithm to appropriately filter the sensed and/or derived parameter signals for smooth operation of the cue system; (4) an algorithm to compare sensed and/or derived parameter signals against predetermined thresholds that are stored in memory of the processing means, e.g., the "maximum continuous" and/or "time interval" operating limits established for specific helicopter subsystems; and (5) an algorithm that generates control signals to implement and regulate the various functions provided by the multi-functional graphics generating/processing means.

The implementation algorithm of the processing means effectuates several diverse functions and transmits one or more control signals to regulate the operation of the multi-functional graphics generating/processing means. In response to an indication that a specific subsystem has exceeded an established "maximum continuous" operating limit and is therefore operating in the corresponding "time interval" condition, the processing means transmits an activation signal to the graphics generating/processing means. Simultaneously, the processing means generates a first clock signal to activate a first counter that clocks the predetermined time limit associated with the corresponding "time interval". The multi-functional graphics generating/processing means is operative in response to the first activation signal to generate a visual cue that is displayed within the visual field of view of the pilot by the display subsystem. The visual cue is a symbolic image that comprises an outline having a length. The outline of the visual cue defines a void region. The void region of the visual cue is blank or empty upon initial entry of the specific subsystem into the "time interval" condition, i.e., at t=0.

As the specific subsystem continues to be operated within the "time interval" condition, the graphics generating/processing means is further operative, in response a second activation signal, to opaque or "fill in" the void region utilizing a "fill" subroutine. The graphics generating/processing means is further operative to correlate the time provided by the first counter, which represents the elapsed time of operation of the specific subsystem in the "time interval" condition, with the length of the visual cue and to proportionately opaque or "fill in" the corresponding portion of the void region based upon the correlated elapsed time. The "filled" portion of the visual cue is a visual representation of the elapsed time of operation of the specific subsystem within the predetermined time limit of the "time interval". Conversely, the "unfilled" portion provides a visual representation of the time remaining for prudent operation of the specific subsystem within the "time interval".

Once the pilot has taken the necessary corrective action to restore the specific subsystem to operation within the established normal operating range, the multi-functional graphics generating/processing means is operative, in response to a reset signal, to "blank out" the visual cue. That is, the visual cue can no longer be seen by the pilot. This feature precludes the pilot from being overloaded by visual stimuli that are unnecessary for prudent and efficient operation of the helicopter. The reset signal also causes the first counter to be inactivated and reset to zero.

Design engineers may establish recovery periods for specific helicopter subsystems. Such recovery periods define a predetermined time interval during which the specific subsystems should be operated within the established normal operating range after recovery from operation within a "time interval" condition. Recovery periods are established to ensure that specific subsystems are not adversely affected due to aperiodic operation between normal operating ranges and "time interval" conditions. For subsystems having a predetermined recovery period associated therewith, a second counter is activated in response to the reset signal to clock the predetermined recovery period.

If the specific subsystem is operated in the normal operating range for the predetermined recovery interval, i.e., the established recovery period, the integrated time/limit exceedance cue system functions as described hereinabove for subsequent operation of the specific subsystem in exceedance of the established normal operating range, i.e., within the respective "time interval" condition. If, however, the specific subsystem is subsequently re-operated in the "time interval" condition before the elapse of the predetermined recovery period, the graphics generating/processing means is operative, in response to a reinitiate signal, to proportionately "prefill" the void region of the visual cue and to adjust the initial setting of the first counter prior to initial display of the visual cue. The "filled" region of the visual cue and the first counter are proportionately adjusted to a greater than zero setting utilizing a recovery equation based upon the predetermined time limit for the specific "time interval" operating condition, the actual elapsed operating time in the prior "time interval" condition, the predetermined recovery period, and the actual recovery time (based upon the second counter). Thus, when the visual cue is initially displayed within the pilot's field of view in this scenario, the void region thereof will be partially opaqued or "filled in". The remainder of the void region of the visual cue is then proportionately opaqued or "filled in" by the graphics generating/processing means based upon the clocking operation of the first counter from the initial time setting.

If a specific subsystem is being operated in a first "time interval" condition having a first predetermined time limit, and subsequently transitions to a second "time interval" condition having a second predetermined time limit that is more time sensitive than the first predetermined time limit, the graphics generating/processing means is operative, in response to a priority signal, to reinitialize the time varying visual cue for functional display based upon the more time sensitive second predetermined time limit. That is, the graphics generating/processing means is operative to reinitialize the void region of the visual cue to time $t=0$, to activate the second counter to clock the second predetermined time limit, and to proportionately opaque or "fill in" the corresponding portion of the void region based upon the more time sensitive second predetermined time limit as provided by the second counter. Concomitantly, the first counter continues clocking the first predetermined time limit such that, if the specific subsystem is subsequently re-operated in the first "time interval" condition, the graphics generating/processing means is operative to reconfigure the visual cue so that the filled portion thereof represents the elapsed time of operation in the first "time interval" condition and to proportionately opaque the remaining portion of the void region based upon the clocking function of the first counter.

Preferably, the visual cue provided by the cue system is a symbolic image having a shape that is cognitively associated with the specific subsystem that has exceeded an established operating limit. Further, the cue system may be operative to spatially position the shaped visual cue to provide further cognitive association with the specific subsystem. For example, the visual cue may be shaped and spatially orientated like a helicopter collective control column so that it provides cognitive connectivity to the transmission or engine subsystems, i.e., power subsystem, of the helicopter. Preferably, the integrated time/limit exceedance cue system of the present invention, when utilized in combination with an HMD or HUD subsystem, is operative to display the visual cue in superposed combination with the symbolic image representing the baseline operating parameter of the specific subsystem.

The integrated time/limit exceedance cue system of the present invention may further include a corrective action cue disposed in conjunction with the visual cue. The corrective action cue is shaped to indicate the appropriate recovery procedure, i.e., movement of the associated flight control input device, to restore the affected subsystem to the established normal operating range. The integrated time/limit exceedance cue system may be further operative to provide a secondary visual and/or aural warning, in conjunction with the time varying visual cue, that a specific subsystem is going to exceed the predetermined time limit of a "time interval" condition.

The functional elements and features of the integrated time/limit exceedance cue system of the present invention may also incorporated in combination with pre-existing subsystem parameter displays.

BRIEF DESCRIPTION OF THE DRAWINGS

A more complete understanding of the present invention and the attendant features and advantages thereof may be had by reference to the following detailed description when considered in conjunction with the accompanying drawings wherein:

FIG. 5 is a block diagram illustrating the multi-functional graphics generating/processing means of the integrated time/limit exceedance cue system according to the present invention.

FIG. 6A illustrates an exemplary time varying visual cue generated by the integrated time/limit exceedance cue system of the present invention.

FIG. 6B illustrates the exemplary time varying visual cue of FIG. 6A, as generated by the integrated time/limit exceedance cue system of the present invention, after elapse of part of the predetermined time period of a "time interval" condition.

DETAILED DESCRIPTION OF PREFERRED EMBODIMENTS

Figure 1:
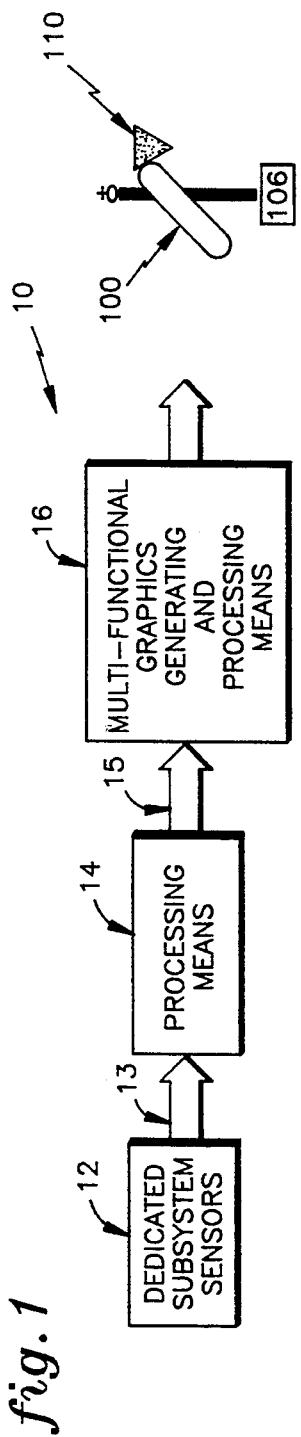
FIG. 1 is a schematic block diagram of an integrated time/limit exceedance cue system according to the present invention.

Referring now to the drawings wherein like reference numerals identify corresponding or similar elements throughout the several views, FIG. 1 is a schematic block diagram that illustrates an integrated time/limit exceedance cue system 10 according to the present invention that is operative to provide a pilot with an event dependent visual cue indicative of the exceedance of established normal operating limits of specific aircraft subsystems and operation thereof in a time critical exceedance condition. The time varying visual cue generated by the cue system 10 also provides a relative indication of the elapsed time of operation of such aircraft subsystems in the time critical exceedance condition. The cue system 10 permits the pilot to utilize the maximum performance capability of such aircraft subsystems without degrading the defined life intervals thereof. The cue system 10 is further operative to prevent inadvertent exceedance of the time critical operating intervals of such specific subsystems by providing real time feedback during operation of the aircraft in the time critical exceedance condition.

The integrated time/limit exceedance cue system 10 is operative to generate the visual cue when a specific aircraft subsystem exceeds an established operating limit, i.e., generation of the visual cue is event dependent. The exceedance events that trigger operation of the cue system 10 are the operation of specific subsystems beyond defined "maximum continuous" operating limits, i.e., operation in a "time interval" condition. The system 10 is further operative to provide a time varying visual cue that is continuously updated to visually indicate the relative time interval during which the specific aircraft subsystem has operated in the "time interval" condition. Conversely, the time varying visual cue provides an indication of the time remaining until the specific aircraft subsystem exceeds the predetermined time limit established for operation in the "time interval" condition. Preferably the time varying visual cue is juxtaposed in combination with the symbology depicting the baseline operating parameter of the specific aircraft subsystem to provide cognitive connectivity between the exceedance event and the specific aircraft subsystem. The cue system 10 may be further operative to provide a corrective action cue in conjunction with the time varying visual cue that alerts the pilot as to the appropriate response to bring the specific aircraft subsystem back within normal operating limits, i.e., out of the "time interval" condition.

To facilitate a fuller appreciation of the attendant functional features and advantages provided by the integrated time/limit exceedance cue system 10 of the present invention, the elements and functions of the cue system 10 of the present invention are described in further detail hereinbelow generally in terms of predetermined "maximum continuous" and "time interval" operating limits of specific subsystems of a UH-60 BLACK HAWK ® helicopter (BLACK HAWK ® is a registered trademark of the Sikorsky Aircraft Division of United Technologies Corporation). It will be appreciated, however, that such disclosure is not intended to limit the scope of the claims appended hereto with respect to any particular helicopter, any specific helicopter subsystems, or any particular "maximum continuous" or "time interval" operating limits. Those skilled in the art will appreciate that helicopters produced by different manufacturers, as well as different models produced by the same manufacturer, may possess different "maximum continuous" and "time interval" operating limits for similar subsystems. Those skilled in the art will further appreciate that while the cue system 10 of the present invention is described hereinbelow in terms of specific helicopter subsystems, the cue system 10 of the present invention may have utility for critical status monitoring of other helicopter subsystems as well as aircraft or vehicle subsystems constrained by similar established operating limits.

Figure 2:
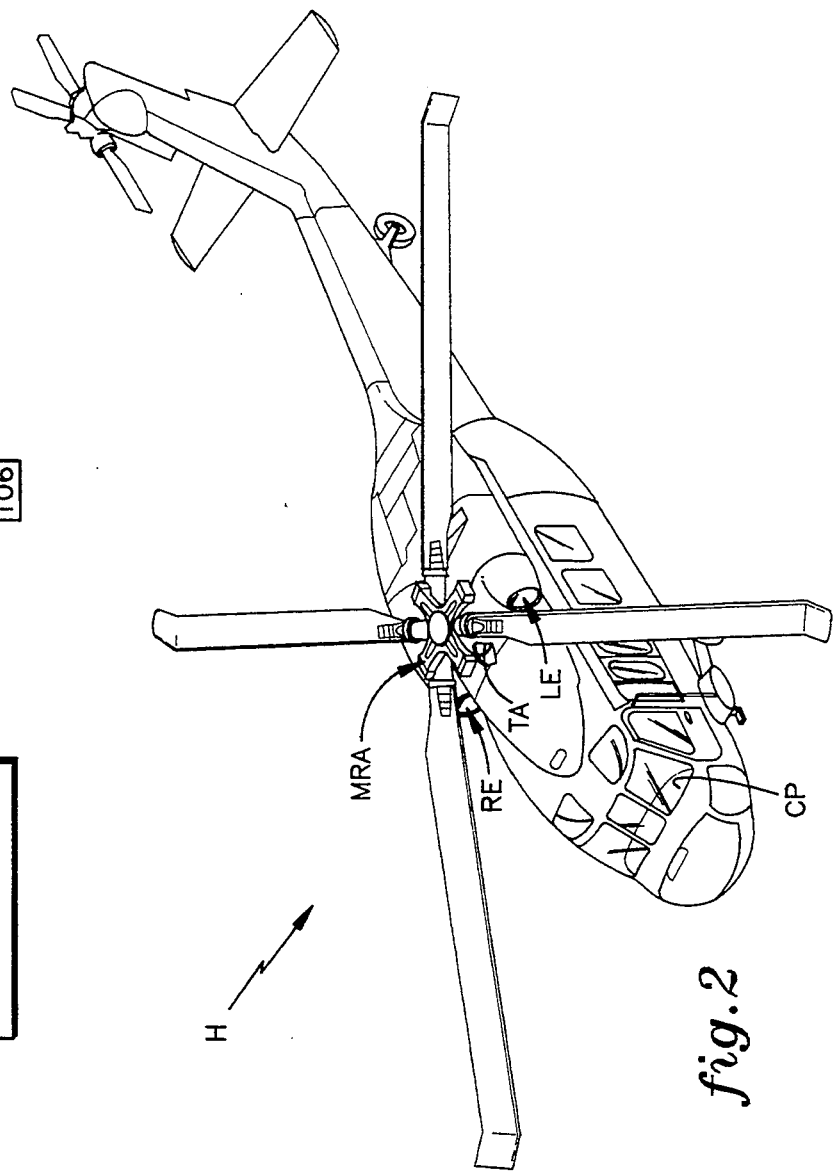
FIG. 2 is a perspective view of a UH-60 helicopter.

The UH-60 BLACK HAWK ® helicopter H is illustrated in FIG. 2 and includes specific subsystems such as right and left gas turbine engines RE, LE, respectively, that are mechanically and functionally interconnected to a main rotor assembly MRA by means of a transmission assembly TA. Such helicopter subsystems are typically monitored by dedicated sensor subsystems, i.e., instrumented, that provide parameter signals that indicate the operating conditions of such specific subsystems. For example, the right and left engines RE, LE are each instrumented to provide a first set of parameter signals representing the revolutions per minute (RPMs) of each engine and a second set of parameter signals representing the torque of each engine. Further, the right and left engines RE, LE are instrumented to provide a set of parameter signals representing the operating temperature of each gas turbine engine. The main rotor assembly MRA is instrumented to provide a parameter signal representing the RPM output of the main rotor shaft.

Figure 3:
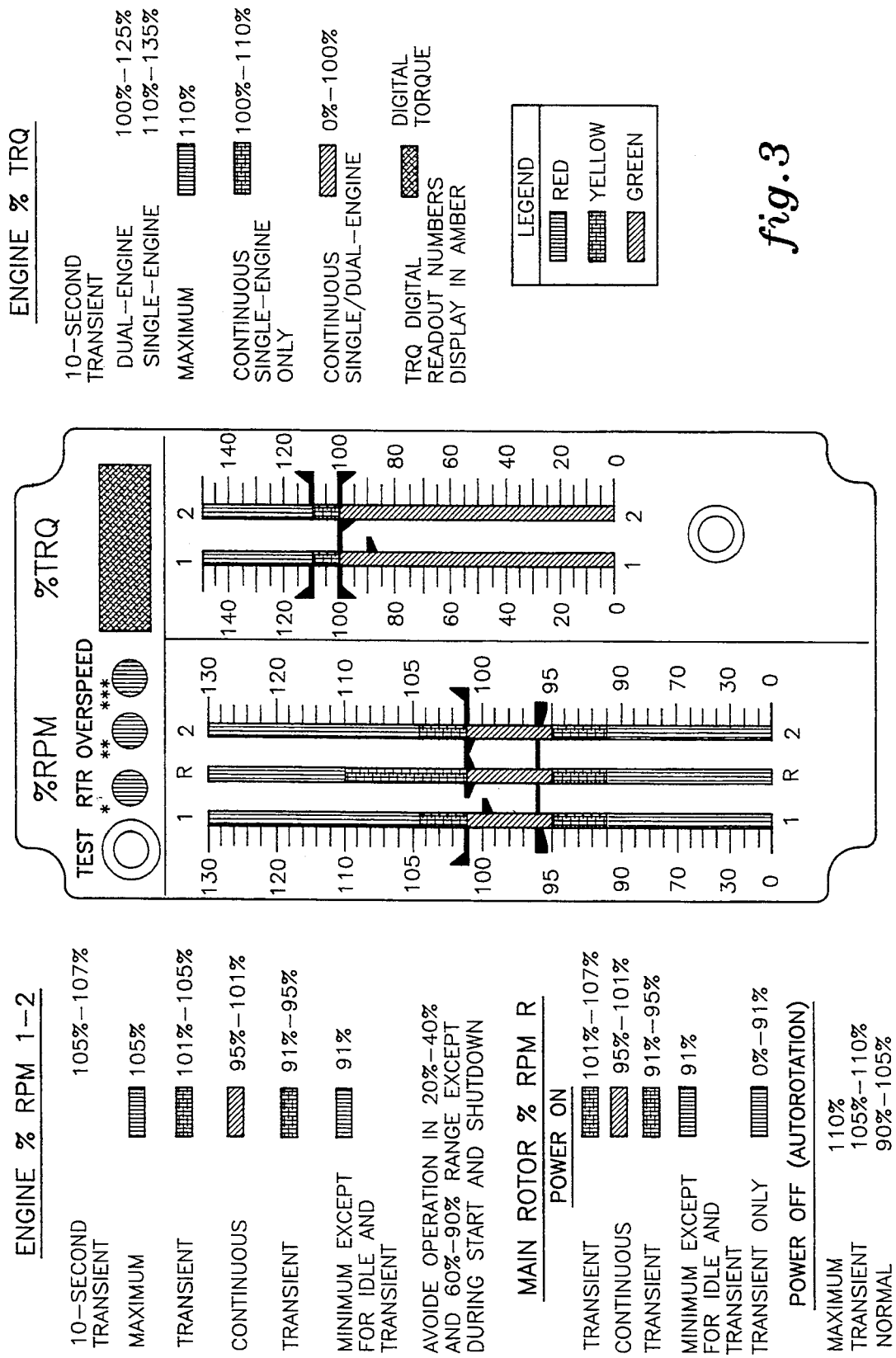
FIG. 3 is an illustration of one analog display of the UH-60 helicopter of FIG. 2.
Figure 4:
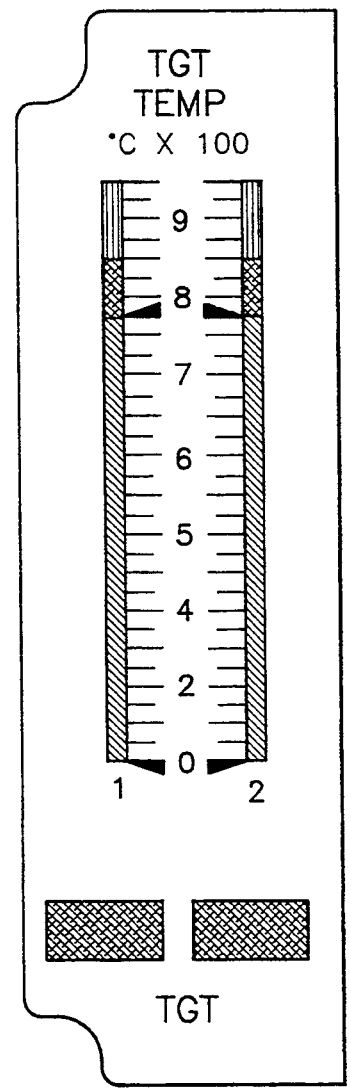
FIG. 4 is an illustration of another analog display of the UH-60 helicopter of FIG. 2.
Figure 4:
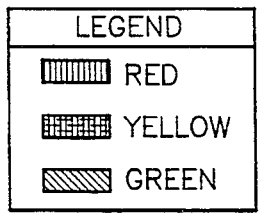

Parameter signals such as those described in the preceding paragraph are utilized to drive dedicated displays that provide the pilot with real time information regarding the operating condition of each such specified subsystem. For example, FIG. 3 illustrates the analog displays mounted in the cockpit panel CP (see FIG. 2) of the UH-60 BLACK HAWK ® helicopter H to provide visual information regarding the RPMs and torque of each of the gas turbine engines RE, LE as well as the RPMs of the main rotor shaft. FIG. 4 illustrates the analog display mounted in the cockpit panel CP to provide visual information regarding the turbine gas temperature (TGT) of each engine RE, LE.

As will be appreciated by an examination of FIGS. 3 and 4, one or more operating ranges and/or limits may be established for each specific subsystem. Such operating ranges and/or limits are based upon engineering criteria that ensure that such specific subsystems are not subjected to inadvertent dynamic stresses which would preclude such subsystems from meeting specified life intervals (established time intervals between scheduled inspections, maintenance, and/or replacement). Operating limits for specific subsystems are defined in operator manuals for the UH-60 helicopter (and incorporated in the displays thereof as exemplarily illustrated in FIGS. 3, 4) as "maximum continuous" and "time interval" limits. These operating limits are established to allow the pilot to utilize the maximum performance capability of specific helicopter subsystems as needed without adversely impacting the specified life intervals of such subsystems.

A specific subsystem may be operated at its "maximum continuous" operating limit indefinitely without adversely affecting its specified life interval. The specific subsystem, however, may only be operated in a "time interval" condition for a predetermined time without adversely affecting the specified life interval. If the predetermined time limit is exceeded and/or the "time interval" operating limit is exceeded, the specified life interval of the subsystem may be adversely affected. Post-flight inspection of the affected subsystem will be required to determine if subsystem damage or degradation was experienced.

Operating ranges and limits for specific subsystems are described in the following paragraphs to facilitate a more complete understanding of the integrated time/limit exceedance cue system 10 of the present invention. For example, with reference to FIG. 3, each gas turbine engine RE, LE has a normal RPM operating range of about 91% to about 105% (the continuous operating range of 95%–101%, a high transient range of 101%–105%, and a low transient range of 91%–95%). The high end of the normal RPM operating range defines the "maximum continuous" RPM operating limit, i.e., 105%, for each gas turbine engine. Each gas turbine engine has an established "time interval" RPM operating limit range of 105%–107%, with an established 10 second limit for engine operation within the "time interval" operating limit range. Operation of a gas turbine engine within the established "time interval" operating limit range beyond the established time limit, i.e., 10 seconds, will require post-flight maintenance inspection of the engine and may result in degradation of the established life interval of the engine. For gas turbine engines, a "minimum continuous" RPM operating limit of 91% has been established based upon minimum power requirements for operation of the helicopter H within a safe flight envelope.

Different torque operating ranges and limits are defined for the gas turbine engines RE, LE, depending upon whether the helicopter H is being powered by both engines or a single engine (once again based upon minimum power requirements for operation of the helicopter H within a safe flight envelope). Dual-engine operation has a normal torque operating range of 0%–100%, with the high end of the range defining the "maximum continuous" operating limit for dual-engine operation, i.e., 100%. A "time interval" torque operating limit range of 100%–125% has been established for dual-engine operation, with a 10 second limit for dual-engine operation within the "time interval" operating limit range. Single-engine operation, in contrast, has a normal torque operating range of 100%–110%, with the high end of the range defining the "maximum continuous" operating limit for single-engine operation, i.e., 110%. A "time interval" torque operating limit range of 110%–135% has been established for single-engine operation, with a 10 second limit for single-engine operation within the "time interval" operating limit range. Single- or dual-engine operation within the established "time interval" operating limit range beyond the established time limit, i.e., 10 seconds, will require post-flight maintenance inspection of the engine(s) and may result in degradation of the established life interval of the engine(s).

With reference to FIG. 4, the gas turbine engines RE, LE have a normal temperature operating range of 0° C.–775° C. A first "time interval" temperature operating limit range of 775° C.–850° C. has been established for the gas turbine engines, with a 30 minute limit for operation of the one or both of the gas turbine engines with the first "time interval" operating limit range. For the gas turbine engines RE, LE, the high end of the first "time interval" operating limit range defines the "maximum continuous" operating limit. It will be appreciated, however, that continuous operation of one or both of the gas turbine engines at the "maximum continuous" operating limit is limited to 30 minutes so that the consequences described hereinabove are not incurred. A second "time interval" operating limit range of 850° C.–886° C. has been established for the gas turbine engines RE, LE, with a 10 second limit for operation of one or both of the gas turbine engines within the second "time interval" operating limit range. Operation of the gas turbine engines RE, LE within the second "time interval" operating range is a more critical flight condition than operation within the first "time interval" operating limit range, and as described hereinbelow in further detail, the cue system 10 of the present invention is responsive to changes in operation of the gas turbine engines RE, LE between the first or second "time interval" operating limit ranges.

The main rotor assembly MRA has a normal RPM operating range of 91%–107% (the continuous operating range of 95%–101%, a high transient range of 101%–107%, and a low transient range of 91%–95%). The high end of the normal operating range defines the "maximum continuous" operating limit, i.e., 107% for the main rotor shaft. No "time interval" operating limit has been established for the main rotor assembly MRA for powered flight operations of the BLACK HAWK ® helicopter H. The lower end of the normal operating range defines a "minimum continuous" operating limit for the main rotor shaft, i.e., 91%, based upon minimum power requirements for operation of the helicopter H within a safe flight envelope. During engine start up, the main rotor assembly MRA will transition through the 0%–91% lower transient RPM operating range.

The integrated time/limit exceedance cue system 10 of the present invention is exemplarily illustrated in FIG. 1 and includes one or more dedicated sensor subsystems 12, a processing means 14, and a multi-functional graphics generating/processing means 16. Specific helicopter subsystems are typically instrumented by one or more dedicated sensor subsystems 12 as described hereinabove. Such dedicated sensor subsystems 12 are operative to monitor the operation of such specific helicopter subsystems and are operative to provide parameter signals 13 representative of the operating conditions of such specific helicopter subsystems of the helicopter H. One efficacious feature of the cue system 10 of the present invention is that it does not require the installation of any special sensor subsystems to generate additional parameter signals. That is, the cue system 10 is operative to utilize the parameter signals 13 generated from the dedicated sensor subsystems 12 that have been installed as original equipment on the helicopter H. For example, most complex helicopters are provided with dedicated sensor subsystems that provide parameter signals representing such operating conditions as rotor speed, engine temperature (TGT), engine torque (Q), engine speed ($N_g$), airspeed, control positions (e.g., cyclic, collective), rotor shaft bending, lateral acceleration, etc.

The processing means 14 is a computer system such as a microprocessor that is operative to monitor the parameter signals 13 provided by the dedicated sensor subsystems 12 and to provide control signals 15 to regulate the operation of the multi-functional graphics generating/processing means 16. Preferably, the Core Automatic Flight Control System (AFCS) processor of the helicopter H is configured to effectuate the functions of the processing means 14 of the cue system 10. The AFCS processor of the helicopter H is an electrohydromechanical computer system that is operative, in response to subsystem parameter signals (as well as signals representing flight conditions such as airspeed, pitch, roll and yaw rates, etc.), to provide inputs to the helicopter flight controls system to assist the pilot in maneuvering and handling the helicopter H. As such, the AFCS processor as originally configured is interfaced with the dedicated sensor subsystems 12 of the helicopter H, thereby eliminating the need to install a separate computer system to provide the functions of the processing means 14.

Alternatively, the graphics display processor of the multi-functional graphics generating/processing means 16 may be configured to effectuate the functions of the processing means 14. For this alternate embodiment, the dedicated sensor subsystems 12 would be directly interfaced with the multi-functional graphics generating/processing means 16.

Algorithms that effectuate the functions of the processing means 14 are embedded in the AFCS processor, the graphics display processor, or a dedicated microprocessor comprising the integrated time/limit exceedance cue system 10. Such algorithms include: (1) an algorithm to monitor the sensed parameter signals 13 generated by the dedicated sensor subsystems 12; (2) algorithms to compute any required derived parameter signals (for example, an algorithm may be provided to compute a derived parameter signal for a main rotor stall condition); (3) an algorithm to appropriately filter the sensed and/or derived parameter signals for smooth operation of the cue system 10; (4) an algorithm to compare sensed and/or derived parameter signals against predetermined thresholds that are stored in memory of the processing means, e.g., the "maximum continuous" and/or "time interval" operating limits established for specific helicopter subsystems; and (5) an algorithm that generates control signals 15 to implement and regulate the various functions provided by the multi-functional graphics generating/processing means 16, as described hereinbelow in further detail. Such algorithms are generally known to those skilled in the art and/or may be readily developed by those skilled in the art by the exercise of routine skills.

The implementation algorithm of the processing means 14 effectuates several diverse functions and transmits one or more control signals 15 to regulate the operation of the multi-functional graphics generating/processing means 16, as illustrated in FIG. 1. In response to an internal signal (generated by the comparison algorithm) that indicates that a sensed parameter of a specific subsystem has exceeded an established "maximum continuous" operating limit, i.e., the specific subsystem is operating in the corresponding "time interval" condition, the algorithm causes the processing means 14 to transmit a first activation signal 18 to the graphics generating/processing means 16 as illustrated in FIG. 5. Simultaneously, the processing means 14 generates a first clock signal 20 to activate a first counter 22 that clocks the predetermined time limit (as stored in memory) associated with the corresponding "time interval". The processing means 14 simultaneously transmits a second activation signal 24 to the graphics generating/processing means 16 while the first counter 22 is operative.

Once the pilot has taken the necessary corrective action to return the specific subsystem to operation within the normal operating limit range (for example, by utilizing the information provided by the corrective action cue of the cue system 10 as described hereinbelow), the processing means 14, in response to another internal signal (or termination of the internal signal described above), transmits a reset signal 26 to the graphics generating/processing means 16 and the first counter 22. Depending upon the specific subsystem that exceeded its "maximum continuous" operating limit, the processing means 14 may be operative to transmit a second clock signal 28 to a second counter 30, as described hereinbelow in further detail.

The implementation algorithm of the processing means 14 may be further operative to provide a reinitiate signal 32 for any subsystem that reexceeds a previously exceeded "maximum continuous" operating limit while the second counter 30 is operative. The algorithm may be further operative to generate a priority signal 34, as necessary, for those subsystems that have more than one "time interval" operating limit associated therewith, e.g., the first and second "time interval" temperature operating limits established for the gas turbine engines RE, LE as described hereinabove.

The multi-functional graphics generating/processing means 16 is illustrated in further detail in FIG. 5. The integrated time/limit exceedance cue system 10 of the present invention is preferably configured for utilization in a helmet-mounted display (HMD) system or a head-up display (HUD) system of the type exemplarily described in U.S. Pat. Nos. 4,446,480, 4,439,775, 4,439,157, 4,305,057, 4,269,476, and 3,923,370. One particular HMD system that is operative to position a generated video image of a baseline operating parameter of a specific helicopter subsystem (more specifically, a five-function power management symbol that provides continuous visual cues of the maximum continuous power available from a helicopter powerplant, the instantaneous power being provided by the powerplant, the power required to hover out of ground effect, and a split torque engine condition) in synchronization within the field of view of the visual system of the pilot is described in commonly-owned U.S. Pat. No. 5,150,117 entitled POWER MANAGEMENT SYMBOLOGY DISPLAY SYSTEM, which is incorporated herein by reference. The cue system 10 of the present invention may also be utilized in conjunction with dedicated head-down or multi-function graphic display systems such as the cockpit mounted analog displays exemplarily illustrated in FIGS. 3 and 4.

For an PIMD embodiment of the integrated time/limit exceedance cue system 10, the multi-functional graphics generating/processing means 16 is electronically interconnected to an HMD subsystem 40 such as described in the '404 patent application. The graphics generating/processing means 16 is operative, inter alia, to provide symbolic images representing baseline operating parameters of specific helicopter subsystems, e.g., the power management symbol described and claimed in the '117 patent, synchronized within the field of view of the visual system of the pilot during both visual and non-visual flight conditions by means of the HMD subsystem 40. A sensing means 50, such as the type described in the '117 patent, is functionally interconnected to the graphics generating/processing means 16 and the HMD subsystem 40 and operative to define the spatial position and angular orientation of the HMD subsystem 40 within the cockpit of the helicopter H so that the symbolic images provided by the graphics generating/processing means 16 are synchronized with the spatial position and angular orientation of the HMD subsystem 40.

The multi-functional graphics generating/processing means 16 is operative in response to the first activation signal 18, which indicates that a specific subsystem has exceeded a "maximum continuous" operating limit, i.e., has commenced operation in the corresponding "time interval" condition, to generate a visual cue 100, as exemplarily illustrated in FIG. 6A, that is displayed within the visual field of view of the pilot by the HMD subsystem 40. The visual cue 100 is a symbolic image that comprises an outline 102 having a length 104. The outline 102 of the visual cue 100 defines a void region 106. The visual cue 100 shown in FIG. 6A illustrates the empty or "unfilled" status of the void region 106 at initial entry of the specific subsystem into the "time interval" condition, i.e., at t=0. Simultaneously, the first clock signal 20 activates the first counter 22 to clock the predetermined time limit associated with the corresponding "time interval".

As the specific subsystem continues to be operated within the "time interval" condition, i.e., the first counter 22 is operative, the graphics generating/processing means 16 is operative, in response to the second activation signal 24, to opaque or "fill in" the void region 106, as illustrated by reference numeral 108 in FIG. 6B, utilizing a "fill" subroutine. Such fill subroutines may be found as part of higher level graphic software packages. The graphics generating/processing means 16 is further operative to correlate the time provided by the first counter 22, which represents the elapsed time of operation of the specific subsystem in the "time interval" condition, with the length 104 of the visual cue 100 and to proportionately opaque or "fill in" the corresponding portion of the void region 106. The "filled" portion 108 of the visual cue 100 is a visual representation of the elapsed time of operation of the specific subsystem within the predetermined time limit of the "time interval". Conversely, the "unfilled" portion of the visual cue 100 provides a visual indication of the time remaining in the predetermined time limit.

For example, the visual cue 100 illustrated in FIG. 6B has an opaqued or "filled in" portion 108 that corresponds to about fifty percent of the length 104 of the visual cue 100. If the "time interval" of the specific subsystem has a predetermined time limit of 10 seconds, the visual cue 100 of FIG. 6B provides a visual indication to the pilot that about one-half of the predetermined time limit has elapsed, i.e., t=5 sec, for operation of the specific subsystem in the "time interval" condition. Thus, the integrated time/limit exceedance cue system 10 provides the pilot with a time varying visual cue 100 indicative of the relative time during which the specific helicopter subsystem has been operated in the "time interval" condition. Conversely, the time varying visual cue 100 indicates the time remaining during which the specific subsystem may be prudently operated in the "time interval" condition.

Once the pilot has taken the necessary corrective action to return the specific subsystem to operation within the established normal operating range, the multi-functional graphics generating/processing means 16 is operative, in response to the reset signal 26, to "blank out" the visual cue 100. That is, the visual cue 100 can no longer be seen by the pilot. This feature precludes the pilot from being overloaded by visual stimuli that are unnecessary for prudent and efficient operation of the helicopter. As long as all specific subsystems are being operated within established normal operating ranges, there is no need for the pilot to see the visual cues 100 generated by the integrated time/limit exceedance cue system 10 of the present invention. The reset signal 26 also causes the first counter 22 to be inactivated and reset to zero.

The functions of the second clock signal 28, the second counter 30, the reinitiate signal 32, and the priority signal 34 may be best explained by reference to the temperature operating limits for the gas turbine engines as described hereinabove. If the helicopter H is operated so that one or both gas turbine engines operate within the first "time interval" temperature operating limit range, the graphics generating/processing means 16 is operative to generate a time varying visual cue 100 as described in the preceding paragraphs. The only difference is that the void region 106 of the visual cue 100 will be proportionately opaqued or "filled in" based upon the predetermined 30 minute time limit of the first "time interval" temperature operating limit range. Several possible operating conditions may be encountered from this baseline exceedance condition, and these conditions are discussed in the following paragraphs.

If the helicopter H is flown so that the operating temperature of the affected gas turbine engine(s) recovers to the normal temperature operating range, i.e., $\leq 775°$ C., before elapse of the predetermined 30 minute time limit of the first "time interval", the graphics generating/processing means 16 is operative in response to the reset signal 26 to blank out the time varying visual cue 100 and reset the first counter 22 as described hereinabove. Simultaneously, however, the second counter 30 is activated in response to the second counter signal 28 to clock a predetermined recovery period associated with the gas turbine engine subsystem.

Design engineers may establish recovery periods for specific helicopter subsystems. Such recovery periods define a predetermined time interval during which the specific subsystems should be operated within the normal operating range after recovery from operation within a "time interval" condition. Recovery periods are established to ensure that specific subsystems are not adversely affected due to aperiodic operation between normal operating ranges and "time interval" conditions. If the specific subsystem is operated in the normal operating range for the predetermined recovery interval, i.e., the established recovery period, the integrated time/limit exceedance cue system 10 functions as described hereinabove for subsequent operation of the specific subsystem in exceedance of the normal operating limit range, i.e., within the respective "time interval" condition.

If, however, the specific subsystem is subsequently re-operated in the "time interval" condition before the elapse of the predetermined recovery period, the integrated time/limit exceedance cue system 10 functions other than as described hereinabove. The graphics generating/processing means 16 is operative in this operating condition, in response to the reinitiate signal 32, to "prefill" the void region 106 of the visual cue 100 and to adjust the initial setting of the first counter 22 prior to initial display of the visual cue 100. The prefill 108 of the void region 106 of the visual cue 100 and the initial setting of the first counter 22 are proportionately adjusted to a greater than zero setting based upon a set of recovery equations. One set of recovery equations having utility in the integrated time/limit exceedance cue system 10 of the present invention are constant slope pro rata equations of the form $$T = Y \times \left(1 - \frac{Q}{R}\right) = \frac{Y}{R} \times (R - Q) \qquad \text{Eq. (1)}$$

$$P = \frac{\frac{Y}{R} \times (R - Q)}{X} \qquad \text{Eq. (2)}$$

where X is the predetermined time limit for the specific "time interval" operating condition, Y represents the actual elapsed operating time in the prior "time interval" condition, R is the predetermined recovery period associated with the "time interval" condition, and Q represents the actual recovery time elapsed. Equation (1) represents the initial time setting, T, for the first counter 22 based upon the values for Y, Q, and R. Equation (2) represents the prefill 108 for the void region 106 based upon the values for X, Y, Q, and R, and is based upon the percentage P (where P=T/X) times the length 104 of the visual cue 100. Thus, when the visual cue 100 is initially displayed within the pilot's field of view in this operating condition, the void region 106 thereof will be partially opaqued or "filled in". That is, the displayed visual cue 100 will resemble the visual cue 100 illustrated in FIG. 6B, not the visual cue 100 illustrated in FIG. 6A. The remainder of the void region 106 of the visual cue 100 is then proportionately opaqued or "filled in" by means of the graphics generating/processing means 16 based upon the clocking operation of the first counter 22 from the initial time setting T.

For example, the gas turbine engines of the helicopter H may have a predetermined recovery period of 10 minutes associated with the predetermined time limit of 30 minutes for the first "time interval" temperature operating limit range. If the gas turbine engines are operated in the normal operating range for 5 minutes after recovery from operation in the first "time interval" condition (assuming an actual elapsed operating time of 15 minutes in the prior "time interval" condition), and then subsequently re-operated in the first "time interval" condition, the first counter 22 is proportionately adjusted based upon the foregoing recovery equation with X=30 minutes, Y=15 minutes, R=10 minutes and Q=5 minutes. Substituting the forgoing parameters into the first recovery equation and solving gives $$T = (15/10) \times (10-5) = 7.5 \text{ min} \qquad (1)$$

That is, the first counter 22 is initially adjusted to a setting corresponding to about seven and one-half minutes, i.e., about one-quarter of the predetermined time limit of 30 minutes for the first "time interval" operating limit range. The void region 106 of the visual cue 100 is prefilled based upon the second recovery equation, i.e., $$P = ((15/10) \times (10-5))/30 = 0.25 \qquad (2)$$

That is, the void region 106 is prefilled to about one-quarter of the length 104 of the visual cue 100. Thus, when the visual cue 100 is initially displayed within the pilot's field of view to indicate a reexceedance of the normal temperature operating limit range, the prefilled portion 108 will occupy about one-quarter of the length 104 of the visual cue 100 (about one-half of the filled portion 108 illustrated in FIG. 6B). The remainder of the void region 106 of the visual cue 100 is then proportionately opaqued or "filled in" based upon the clocking operation of the first counter 22 for the remaining 22.5 minutes of the predetermined 30 minute time limit of the first "time interval".

If a specific subsystem is being operated in a first "time interval" condition having a first predetermined time limit, and subsequently transitions to a second "time interval" condition having a second predetermined time limit that is more sensitive than the first predetermined time limit, the graphics generating/processing means 16 is operative, in response to the priority signal 34, to reinitialize the time varying visual cue 100 for functional display based upon the more time sensitive second predetermined time limit. For this operating condition, the graphics generating/processing means 16 is operative to reinitialize the void region 106 of the visual cue 100 to time t=0 (see FIG. 6A), to activate the second counter 30 by means of the second counter signal 28 to clock the second predetermined time limit, and to proportionately opaque or "fill in" the corresponding portion of the void region 106 based upon the more time sensitive second predetermined time limit as provided by the second counter 30. For example, if the gas turbine engines are being operated in the first "time interval" condition under the 30 minute time limit and subsequently transition to the second "time interval" condition having the 10 second time limit, the graphics generating/processing means 16 is operative to reinitialize the time varying visual cue 10 so that opaquing or "filling in" of the entire void region 106 thereof is based upon the second time limit of 10 seconds.

Concomitantly, the first counter 22 continues clocking the first predetermined time limit during operation of the cue system 10 as described in the preceding paragraph with respect to the higher priority time limit. If the specific subsystem is subsequently re-operated in the first "time interval" condition, i.e., the lower priority time limit, the graphics generating/processing means 16 is operative (e.g., in response to termination of the priority signal 34) to reconfigure the visual cue 100 so that the filled portion 108 represents the elapsed time of operation in the first "time interval" condition as reflected by time count provided by the first counter 22. The graphics generating/processing means 16 is then further operative to proportionately opaque or "fill in" the remaining portion of the void region 106 of the visual cue 100 based upon the clocking function of the first counter 22, which represents the operating time remaining for operation of the specific subsystem in the first "time interval" condition.

Other features of the integrated time/limit exceedance cue system 10 of the present invention are described in the following paragraphs. Preferably, the visual cue 100 provided by the cue system 10 is a symbolic image having a shape that is cognitively associated with the specific subsystem that has exceeded an established normal operating limit. Further, the cue system 100 may be operative to spatially position the shaped visual cue 100 to provide further cognitive association with the specific subsystem. Cognitive association as used in the present context refers to shaping and/or spatial positioning of the visual cue 100 to correspond to the general configuration (and spatial orientation if appropriate) of the particular flight control device utilized by the pilot for providing inputs to regulate the operation of the specific subsystem.

For example, the visual cue 100 illustrated in FIGS. 6A, 6B is shaped and spatially orientated like a helicopter collective control column so that it provides cognitive connectivity to the transmission and engine subsystems, i.e., power subsystem, of the helicopter H. Thus, when a specific subsystem exceeds a normal operating limit associated therewith, the shaped and/or spatially orientated visual cue 100 generated by the cue system 10 of the present invention provides the pilot with additional information concerning the particular exceedance event.

Figure 7A:
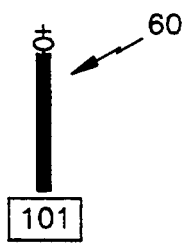
FIG. 7A illustrates an exemplary symbolic baseline operating parameter for the power subsystem of a helicopter.

Preferably, the integrated time/limit exceedance cue system 10 of the present invention, when utilized in combination with an HMD subsystem 40, is operative to display the visual cue 100 in superposed combination with the symbolic image representing the baseline operating parameter of the specific subsystem. The symbolic baseline operating parameter of the power subsystem, i.e., engine and transmission subsystems, of the helicopter H, for example, may be the power management symbol 60 as described and claimed in the '117 patent and as exemplarily illustrated in FIG. 7A. The cue system 10 is operative to superpose (or overlay) an appropriate visual cue 100, for example the shaped, spatially orientated visual cue 100 described in the preceding paragraph, in combination with the symbolic baseline operating parameter, as exemplarily illustrated in FIG. 7B. Displaying a shaped, and/or spatially orientated visual cue 100 in combination with the symbolic baseline operating parameter of the affected subsystem greatly enhances the utility of the visual information available to the pilot during exceedance events.

Figure 8A:
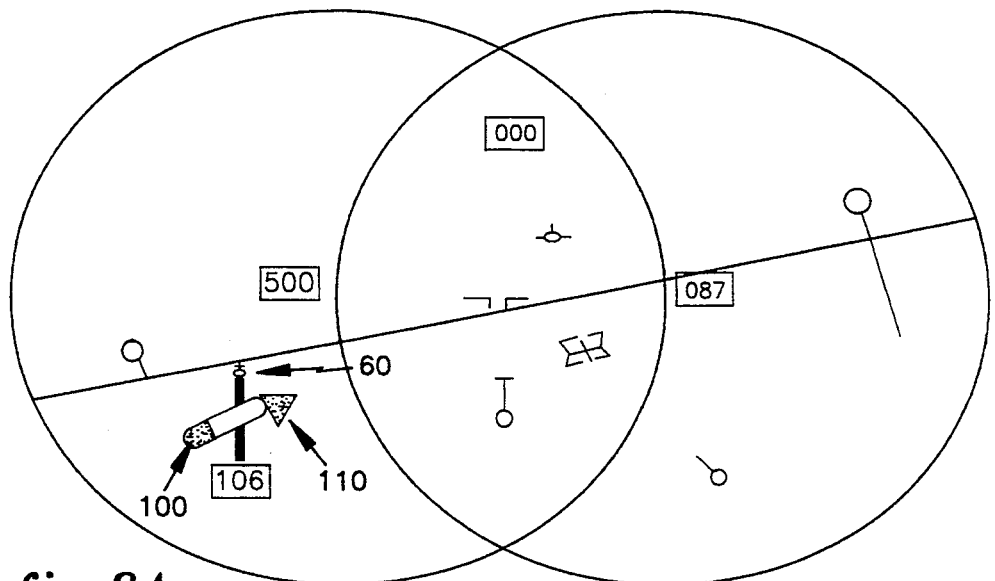
FIGS. 8A, 8B illustrate corrective action cues generated by the integrated time/limit exceedance cue system of the present invention.
Figure 8B:
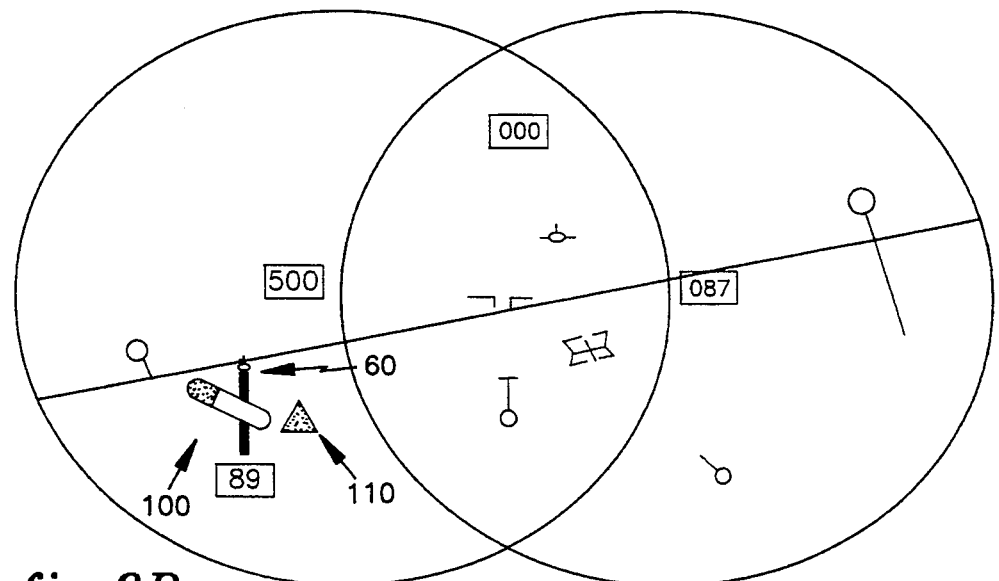

The integrated time/limit exceedance cue system 10 of the present invention may further include a corrective action cue 110 disposed in conjunction with the visual cue 100, as exemplarily illustrated in FIGS. 8A, 8B. The corrective action cue 110 is shaped to indicate the appropriate direction for movement of the associated flight control input device, here represented by the shaped and spatially orientated visual cue 100 having a configuration and orientation cognitively associated with the collective control column, to restore the affected subsystem to the normal operating limit range, i.e., the appropriate recovery procedure. FIG. 8A illustrates a corrective action cue 110 shaped as a downwardly pointing arrow that is disposed in combination with a visual cue 100 that indicates that the power subsystem has exceeded its normal operating limit (e.g., the underlying power management symbol 60 indicates engine RPM is 106%). The corrective action cue 110 informs the pilot that the appropriate recovery procedure is to lower the collective control column to restore the power subsystem to its established normal operating range (e.g., $\leq 105\%$). FIG. 8B illustrates a corrective action cue 110 shaped as an upwardly pointing arrow (the underlying power management symbol 60 indicates a drop below the "minimum continuous" engine RPM operating limit of 91%) that informs the pilot that the collective control column must be raised to restore the power subsystem to its established normal operating range (e.g., $\geq 91\%$). Note that for this embodiment of the cue system 10, the spatial orientation of the visual cue 100 is indirectly related to the recovery procedure indicated by the corrective action cue 110.

Figure 7B:
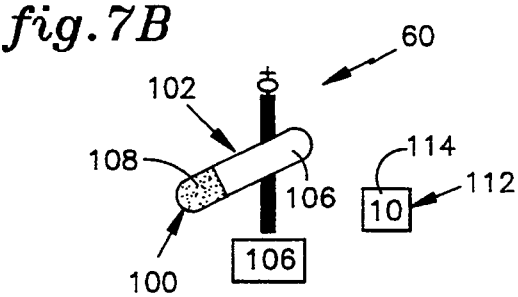
FIG. 7B illustrates a shaped and spatially orientated visual cue generated by the integrated time/limit exceedance cue system of the present invention in superposed combination with the symbolic baseline operating parameter of FIG. 7A.

The integrated time/limit exceedance cue system 10 of the present invention may also include an alphanumeric display 112 adjacent the visual cue 100 as exemplarily illustrated in FIG. 7B. The alphanumeric display 112 provides a descriptor 114 that identifies the "time limit" parameter which has been exceeded. The descriptor 114 may be the "time limit", e.g., 30, 10, or 2.5 minutes (a "time limit" of 10 minutes is illustrated in the alphanumeric display 112 of FIG. 7B), or may identify the particular subsystem to which the limit is directly applicable, e.g., "ENG" for engine or "TR" for transmission. The descriptor 114 may also include a further identifier such as "T" for temperature or "S" for a speed limiting parameter.

The integrated time/limit exceedance cue system 10 may be further operative to provide a secondary visual and/or aural warning 36V, 36A, respectively, that a specific subsystem is going to exceed the predetermined time limit of a "time interval" condition, as represented by the time varying visual cue 100. For example, when a certain percentage of the predetermined time limit has elapsed, e.g., 97%, the graphics generating/processing means 16 may be operative to generate a signal 38V to cycle the visual cue 100 OFF/ON, i.e., periodically blank out and visually display, at a predetermined rate, e.g., 4 HZ, to indicate impending exceedance of the predetermined time limit. Alternatively, or in combination with the visual warning 36V, an aural warning 36A such as a continuous or intermittent aural tone or a verbal message may be generated (utilizing the internal communications capability of the helicopter H) by means of a signal 38A from the graphics generating/processing means 16. The "strobing" effect of the visual warning 36V and/or the aural warning 36A provided by the cue system 10 is intended to catch the attention of the pilot during high workload flight conditions. In the alternative, the cue system 10 may be operative to implement the foregoing visual "strobing" function with respect to the corrective action cue 110 for those cue system 10 embodiments that are functionally operative to generate corrective action cues 110.

Figure 9:
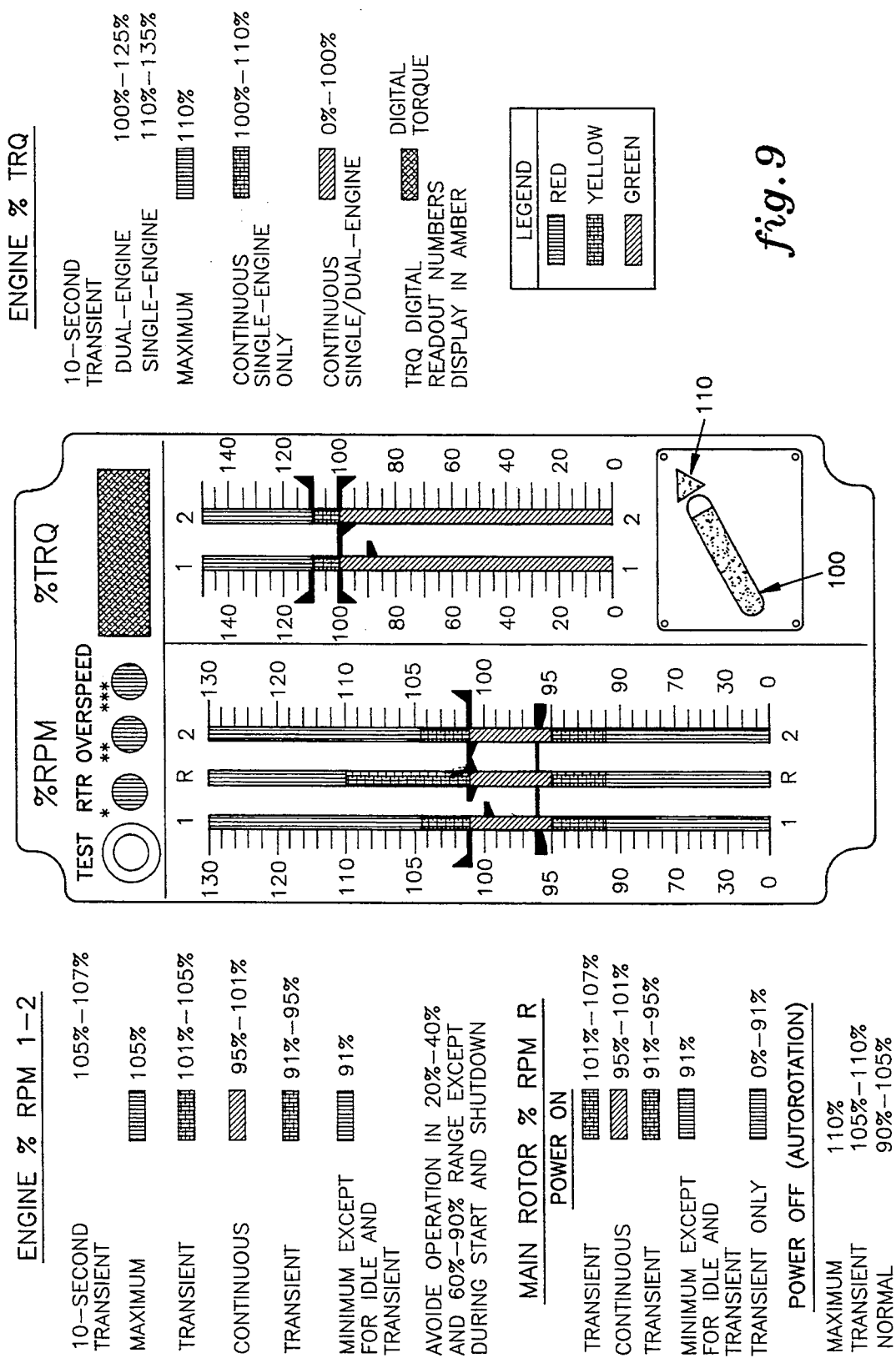
FIG. 9 illustrates the visual cue generated by the integrated time/limit exceedance cue system of the present invention in combination with the analog display of FIG. 3.

The features of the integrated time/limit exceedance cue system 10 of the present invention as described in the preceding paragraphs may also be incorporated in combination with pre-existing subsystem parameter displays such as those illustrated in FIGS. 3 and 4. FIG. 9 illustrates the inclusion of the shaped, spatially orientated visual cue 100 and the corrective action cue 110 described hereinabove in combination with the analog display of engine/rotor RPM and engine torque illustrated in FIG. 3. In this embodiment, it will be appreciated that the visual cue 100 and the corrective action cue 110 will have to be displayed immediately adjacent (rather than superposed with) the respective vertical bar displays representing engine/rotor RPM and engine torque.

A variety of modifications and variations of the present invention are possible in light of the above teachings. The integrated time/limit exceedance cue system described hereinabove may be utilized to provide visual cues for any particular subsystem that is subject to time-dependent limits. For example, the cue system may be utilized to provide a time varying visual cue to clock operation of a helicopter transmission gearbox after a chip detection. Similarly, the cue system may be operative to provide time varying visual cues based upon specific feedback parameters such as airframe vibration or the spectral metal content of transmission oil. It is therefore to be understood that, within the scope of the appended claims, the present invention may be practiced otherwise than as specifically described hereinabove.

What is claimed is:

1. An integrated time/limit exceedance cue system for alerting a pilot that a specific aircraft subsystem has exceeded an established operating range and is operating in a time critical exceedance condition defined by a predetermined time limit, comprising:

sensor subsystem means for monitoring operation of aircraft subsystems and providing parameter signals representing operating conditions of the aircraft subsystems;

processing means for comparing said parameter signals against stored threshold values defining limits for established operating ranges of the aircraft subsystems and for generating an activation signal indicative of exceedance of the established operating range by the specific aircraft subsystem and operation thereof in the time critical exceedance condition; and graphics generating/processing means operative in response to said activation signal for generating a visual cue, said visual cue being a symbolic image defined by an outline having a predetermined length and wherein said outline defines a void region, said symbolic image alerting the pilot that the specific aircraft subsystem has exceeded the established operating image and is operating in the time critical exceedance condition;

said graphics generating/processing means being further operative for continually modifying said visual cue by filling in said void region thereof in proportion to said predetermined length of said outline and elapsed time of operation of the specific aircraft subsystem in the time critical exceedance condition with respect to the predetermined time limit thereof to provide the pilot with a time varying visual cue wherein said filled-in void region of said outline is a relative visual indication of the elapsed time of operation of the specific aircraft subsystem within the time critical exceedance condition in relative proportion to the predetermined time limit; and wherein said void region which is unfilled provides a relative visual indication to the pilot of time remaining in the predetermined time limit.

2. The integrated time/limit exceedance cue system of claim 1, wherein said graphics generating/processing means is further operative to generate a baseline operating parameter symbolic image for the specific aircraft subsystem operating in the time critical exceedance condition and is further operative to generate said symbolic image comprising said visual cue superposed in combination over said baseline operating parameter symbolic image.

3. The integrated time/limit exceedance cue system of claim 1 wherein said graphics generating/processing means is operative to generate an aural warning in conjunction with said time varying visual cue to indicate that operation of the specific aircraft subsystem in the time critical exceedance condition has exceeded a predetermined percentage of the predetermined time limit of the time critical exceedance condition.

4. The integrated time/limit exceedance cue system of claim 1, wherein said symbolic image comprising said visual cue has a configuration cognitively associated with the specific aircraft subsystem operating in the time critical exceedance condition.

5. The integrated time/limit exceedance cue system of claim 4 wherein the aircraft is a helicopter, the specific subsystem operating in the time critical exceedance condition is the powerplant of the helicopter, and said configuration of said symbolic image comprising said visual cue is a collective control column.

6. The integrated time/limit exceedance cue .system of claim 5 wherein said graphics generating/processing means is further operative for generating a corrective action visual cue in conjunction with said collective control column symbolic image to indicate a recovery procedure to restore the helicopter powerplant to operation within the established operating range.

7. The integrated time/limit exceedance cue system of claim 6 wherein said corrective action visual cue is a triangle, and wherein said triangle points downwardly to indicate the proper recovery is to lower the collective control column to restore the helicopter powerplant to operation within the established operating range and points upwardly to indicate the proper recovery is to raise the collective control column to restore the helicopter powerplant to operation within the established operating range.

8. The integrated time/limit exceedance cue system of claim 1 wherein said processing means is operative to generate a reset signal once the pilot has taken corrective action to restore the specific aircraft subsystem to operation within the established operating range, and wherein said graphics generating/processing means is operative in response to said reset signal to blank out said time varying visual cue.

9. The integrated time/limit exceedance cue system of claim 8 wherein the specific aircraft subsystem has an established recovery period defined by a predetermined time interval, and wherein said graphic generating/processing means is further operative in response to said reset signal for clocking the predetermined time interval of the established recovery period of the specific aircraft subsystem.

10. The integrated time/limit exceedance cue system of claim 9 wherein
said processing means is operative to generate a reinitiate signal if the specific aircraft subsystem is reoperated in the time critical exceedance condition prior to elapse of the predetermined time interval of the established recovery period of the specific aircraft subsystem; and wherein
said graphics generating/processing means is operative in response to said reinitiate signal to provide a partially modified visual cue to alert the pilot that the specific aircraft subsystem has reexceeded the established operating range and is operating in the time critical exceedance condition, said partially modified visual cue providing a visual indication of exceedance elapsed time utilizing a set of recovery equations based upon the predetermined time limit of the time critical exceedance condition, the actual elapsed operating time in the prior time critical exceedance condition, the established recovery period, and actual operating time in the established recovery period; and wherein
said graphics generating/processing means is operative for continually modifying said partially modified visual cue to provide said time varying visual cue indicative of remaining time of operation of the specific aircraft subsystem within the time critical exceedance condition relative proportionately to a time period defined by the predetermined time limit minus said exceedance elapsed time.

11. The integrated time/limit exceedance cue system of claim 10 wherein said set of recovery equations comprises $$T = Y \times \left(1 - \frac{Q}{R}\right) = \frac{Y}{R} \times (R - Q)$$

$$P = \frac{\frac{Y}{R} \times (R - Q)}{X}$$

where T is an initial time setting, Y represents the actual elapsed operating time in the prior time interval condition, R is the established recovery period associated with the time interval condition, and Q represents the actual operating time in the established recovery period, and further wherein said exceedance elapsed time of said partially modified visual cue is equal to P where X is the predetermined time limit of the time critical exceedance condition.

12. The integrated time/limit exceedance cue system of claim 1 wherein said graphics generating/processing means is further operative for generating a corrective action visual cue in conjunction with said visual cue to indicate a recovery procedure to restore the specific aircraft subsystem to operation within the established operating range.

13. The integrated time/limit exceedance cue system of claim 12 wherein said graphics generating/processing means is operative to strobe said corrective action visual cue to indicate that operation of the specific aircraft subsystem in the time critical exceedance condition has exceeded a predetermined percentage of the predetermined time limit of the time critical exceedance condition.

14. The integrated time/limit exceedance cue system of claim 1 wherein the specific aircraft subsystem has established therefor first and second time critical exceedance conditions having first and second predetermined time limits, respectively, the first predetermined time limit being greater in time value than the second predetermined time limit; and wherein
said processing means is operative for comparing said parameter signals against the stored threshold values defining limits for established operating ranges for the aircraft subsystems, for generating said activation signal indicative of operation of the specific aircraft subsystem in the first time critical exceedance condition, and for generating a priority signal indicative of transition of operation of the specific aircraft subsystem from the first time critical exceedance condition to the second time critical exceedance condition; and wherein
said graphics processing means is operative in response to said activation signal for generating said visual cue to alert the pilot that the specific aircraft subsystem has exceeded the established operating limit and is operating in the first time critical exceedance condition and for continually modifying said visual cue to provide a first time varying visual cue indicative of time of operation of the specific aircraft subsystem within the first time critical exceedance condition in relative proportion to the first predetermined time limit; and wherein
said graphics generating/processing means is operative in response to said priority signal to reinitialize said visual cue to indicate operation of the specific aircraft subsystem in the second time exceedance condition and for continually modifying said visual cue to provide a second time varying visual cue indicative of time of operation of the specific aircraft subsystem within the second time critical exceedance condition in relative proportion to the second predetermined time limit.

15. The integrated time/limit exceedance cue system of claim 1 wherein said graphics generating/processing means is operative to strobe said time varying visual cue to indicate that operation of the specific aircraft subsystem in the time critical exceedance condition has exceeded a predetermined percentage of the predetermined time limit of the time critical exceedance condition.

* * * * *